(12) United States Patent
Juhola et al.

(10) Patent No.: US 9,723,205 B2
(45) Date of Patent: Aug. 1, 2017

(54) DISPLAY CAMERA OPERATION

(75) Inventors: Mikko Juhola, Muurla (FI); Vicente Calvo Alonso, Piispanristi (FI)

(73) Assignee: Nokia Technologies Oy, Espoo (FI)

(*) Notice: Subject to any disclaimer, the term of this patent is extended or adjusted under 35 U.S.C. 154(b) by 203 days.

(21) Appl. No.: 14/408,632

(22) PCT Filed: Jun. 20, 2012

(86) PCT No.: PCT/FI2012/050639
§ 371 (c)(1),
(2), (4) Date: Feb. 27, 2015

(87) PCT Pub. No.: WO2013/190171
PCT Pub. Date: Dec. 27, 2013

(65) Prior Publication Data
US 2015/0172542 A1 Jun. 18, 2015

(51) Int. Cl.
H04N 5/232 (2006.01)
G02F 1/133 (2006.01)
H04N 1/00 (2006.01)
H04N 5/225 (2006.01)
G02F 1/1333 (2006.01)

(52) U.S. Cl.
CPC ..... *H04N 5/23232* (2013.01); *G02F 1/13338* (2013.01); *H04N 1/00411* (2013.01); *H04N 1/00453* (2013.01); *H04N 1/00461* (2013.01); *H04N 5/2251* (2013.01); *H04N 5/2258* (2013.01); *H04N 5/23216* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 6,208,373 B1* | 3/2001 | Fong | H04N 7/144 348/14.03 |
| 6,259,470 B1* | 7/2001 | Koizumi | H04N 7/142 348/14.01 |
| 7,015,954 B1* | 3/2006 | Foote | G06T 3/4038 348/159 |
| 2005/0128332 A1 | 6/2005 | Tsuboi | 348/333.12 |
| 2006/0007222 A1 | 1/2006 | Uy | 345/207 |
| 2008/0165267 A1 | 7/2008 | Cok | 348/333.01 |
| 2009/0027566 A1 | 1/2009 | Wargon | |
| 2011/0019056 A1 | 1/2011 | Hirsch et al. | |
| 2011/0080487 A1 | 4/2011 | Venkataraman et al. | |
| 2012/0026160 A1 | 2/2012 | Suh et al. | |
| 2012/0182437 A1 | 7/2012 | Dudek et al. | 348/220.1 |
| 2013/0021447 A1* | 1/2013 | Brisedoux | H04N 5/2258 348/47 |
| 2013/0222656 A1* | 8/2013 | Kaneko | H04N 5/247 348/262 |

* cited by examiner

*Primary Examiner* — Timothy J Henn
(74) *Attorney, Agent, or Firm* — Harrington & Smith

(57) ABSTRACT

An apparatus including a processor and a user interface unit including a displaying surface (220) and an image sensor array (240) integrated therewith. The image sensor array includes a group of image sensors (340a, 340b, 340c), each image sensor being configured for capturing an image. A first image is captured with each active image sensor of the group of image sensors, a number of images is chosen from the first images and a second image is formed from the chosen images.

29 Claims, 6 Drawing Sheets

DISPLAY CAMERA OPERATION

TECHNICAL FIELD

The present application generally relates to display cameras and imaging.

BACKGROUND

A display camera is a display into which a digital camera unit has been integrated. The camera and the display can be used concurrently, i.e. the user can view an image on the display while the integrated camera unit is operated. Typically the display camera comprises a touch sensitive display.

A display camera is capable of shooting both still images and video. Use of the camera unit while simultaneously inputting commands through the touch sensitive display is often required, for example when a video conversation and use of other functions of the device comprising the display camera is desired by a user of the device.

SUMMARY

Various aspects of examples of the invention are set out in the claims.

According to a first example aspect of the invention, there is provided an apparatus, comprising:
 a user interface unit comprising
  a displaying surface; and
  an image sensor array integrated with the displaying surface, the image sensor array comprising a group of image sensors, each image sensor being configured for capturing an image; and
 a processor being configured for controlling the user interface unit; wherein
 the processor is configured to cause
  capturing a first image with each active image sensor of the group of image sensors;
  choosing a number of images from the first images; and
  forming a second image from the chosen images.

The user interface unit may further comprise a touch sensor.

The processor may further be configured to cause activating or disabling an image sensor of the group of image sensors.

The processor may further be configured to cause activating or disabling an image sensor of the group of image sensors in response to a touch or proximity of an object detected by the touch sensor.

The processor may further be configured to cause activating or disabling an image sensor of the group of image sensors in response to an application being run on the processor.

The processor may further be configured to cause changing the size of an image sensor of the group of image sensors.

The processor may further be configured to cause changing the size of an image sensor of the group of image sensors in response to a touch or proximity of an object detected by the touch sensor.

The processor may further be configured to cause changing the size of an image sensor of the group of image sensors in response to an application being run on the processor The processor may further be configured to cause changing the number of the image sensors in the group of image sensors.

The processor may further be configured to cause changing the number of the image sensors in the group of image sensors in response to a touch or proximity of an object detected by the touch sensor.

The processor may further be configured to cause changing the number of the image sensors in the group of image sensors in response to an application being run on the processor The processor may further be configured to cause choosing the images from the first images based on a comparison of the images.

The processor may further be configured to cause choosing the images from the first images based on an analysis of each first image.

The processor may further be configured to cause forming the second image from the chosen images using a super-resolution algorithm.

The second image may be a part of a sequence of images.

The sequence of images may comprise a video.

According to a second example aspect of the invention, there is provided a method, comprising:
 providing a user interface unit comprising an image sensor array integrated with a displaying surface, the image sensor array comprising a group of image sensors, each image sensor being configured for capturing an image;
 capturing a first image with each active image sensor of the group of image sensors;
 choosing a number of images from the first images; and
 forming a second image from the chosen images.

The user interface unit may further comprise a touch sensor.

The method may further comprise activating or disabling an image sensor of the group of image sensors.

The method may further comprise activating or disabling an image sensor of the group of image sensors in response to a touch or proximity of an object detected by the touch sensor.

The method may further comprise activating or disabling an image sensor of the group of image sensors in response to an application being run on the processor.

The method may further comprise changing the size of an image sensor of the group of image sensors.

The method may further comprise changing the size of an image sensor of the group of image sensors in response to a touch or proximity of an object detected by the touch sensor.

The method may further comprise changing the size of an image sensor of the group of image sensors in response to an application being run on the processor.

The method may further comprise changing the number of the image sensors in the group of image sensors.

The method may further comprise changing the number of the image sensors in the group of image sensors in response to a touch or proximity of an object detected by the touch sensor.

The method may further comprise changing the number of the image sensors in the group of image sensors in response to an application being run on the processor The method may further comprise choosing the images from the first images based on a comparison of the images.

The method may further comprise choosing the images from the first images based on an analysis of each first image.

The method may further comprise forming the second image from the chosen images using a super-resolution algorithm.

The second image may be a part of a sequence of images.

The sequence of images may comprise a video.

According to a third example aspect of the invention, there is provided a computer program, comprising:

code for performing a method of an example aspect of the invention, when the computer program is run on a processor.

According to a fourth example aspect of the invention, there is provided a memory medium comprising the computer program of the third example aspect of the invention.

According to a fifth example aspect of the invention, there is provided a use of the apparatus of the first aspect, the method of the second aspect, the computer program of the third aspect and/or the memory medium of the fourth aspect in imaging.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
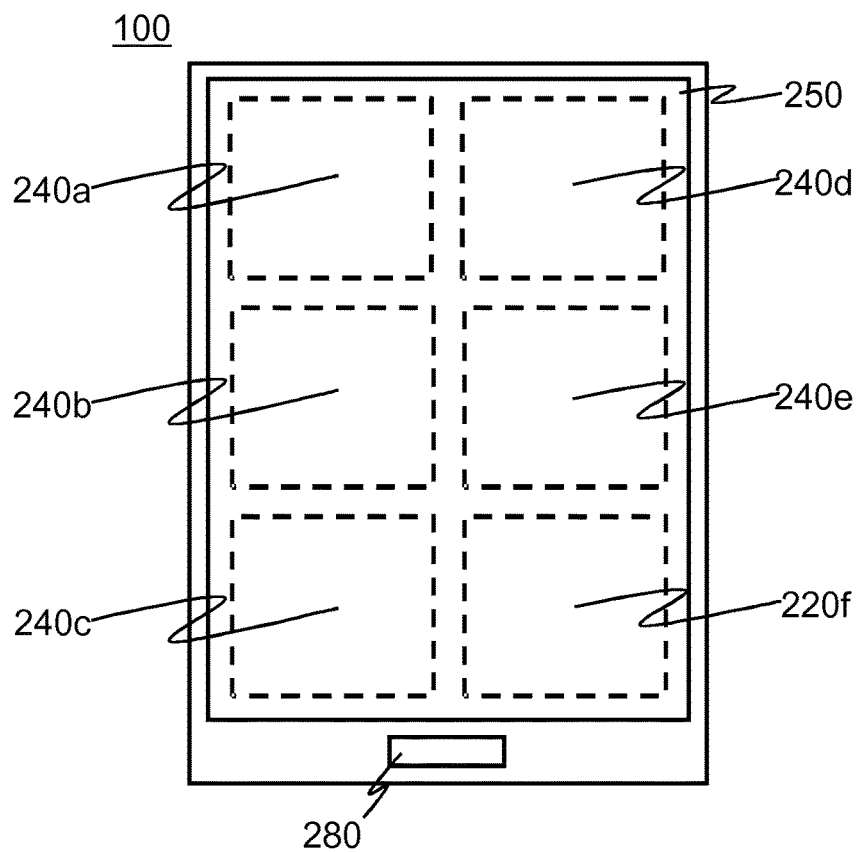
FIG. 1 shows a schematic principle view of a device comprising an apparatus according to an example embodiment.

FIG. 1 shows a schematic principle view of a device 100, such as a mobile phone, gaming device, personal digital assistant, camera, tablet computer, laptop computer, computer monitor or television unit, comprising a display camera apparatus according to an example embodiment. The device 100 comprises a user interface unit 250 comprising, in an example embodiment, for example a touch sensitive display. Integrated with or into, herein after integrated with, the touch sensitive display 250 is an array of image sensors 240a-f. The image sensors 240a-f are in an example embodiment integrated with, for example situated under, the touch sensitive display 250 and capture an image through a displaying surface 220 of the touch sensitive display. A skilled person appreciates that the term integrated with encompasses any type of integration of the image sensor array 240—or any other element—with, into and/or to a further element. In an example embodiment, the device comprises further user interface elements 280, such as buttons, switches, microphones, speakers or keyboard elements. A skilled person appreciates that in a further example embodiment, the user interface unit alternatively comprises a display without touch sensitivity.

Figure 2:
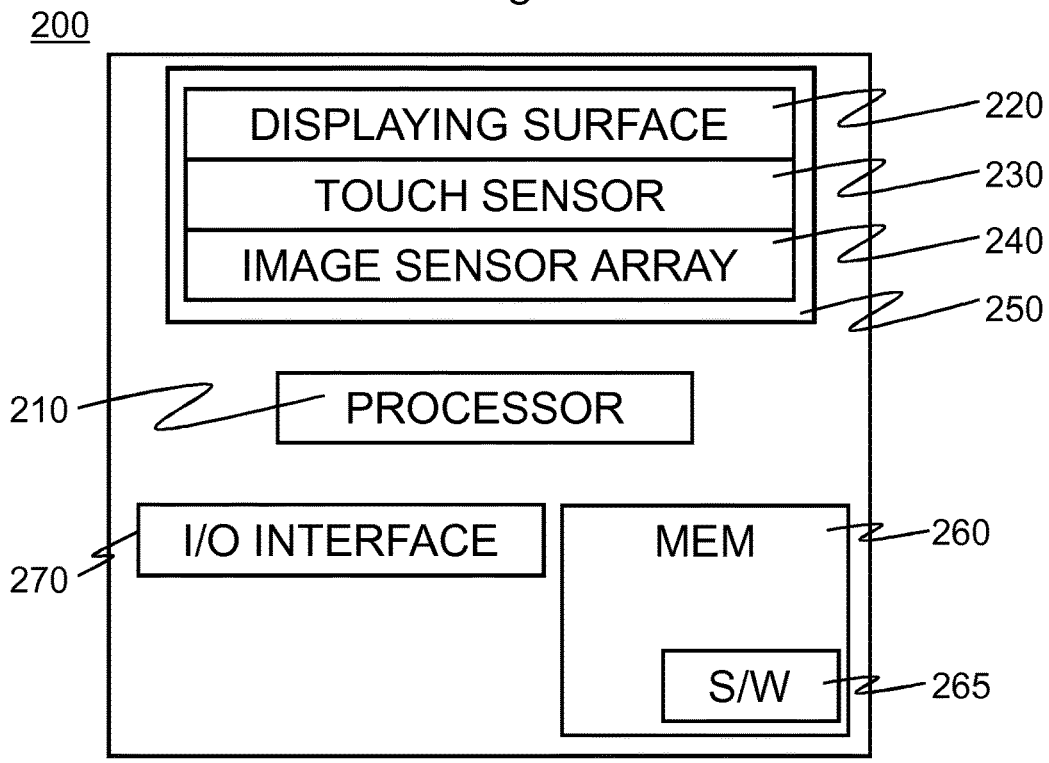
FIG. 2 shows a block diagram of an apparatus of an example embodiment.

FIG. 2 shows a block diagram of an apparatus 200 of an example embodiment. The apparatus 200 comprises a processor 210, a user interface unit 250, a memory 260 and an input/output (I/O) interface 270 coupled to each other. The memory 260 comprises a work memory and a non-volatile memory such as a read-only memory, flash memory, optical or magnetic memory. In the memory 260, typically at least initially in the non-volatile memory, there is stored software 265 operable to be loaded into and executed by the processor 210. The software 265 may comprise one or more software modules and can be in the form of a computer program product that is software stored in a memory medium. The user interface unit 250 comprises a displaying surface 220, a touch sensor 230, or an array of touch sensors, and an image sensor array 240 integrated with the displaying surface 220. In an example embodiment, a lens or an array of lenses (not shown) is integrated with the array of image sensors 240 and/or with the displaying surface 220. In a further example embodiment, the lens or array of lenses is an adaptive lens or an array of adaptive lenses, comprising for example electronic liquid crystal lenses.

In an example embodiment, the displaying surface 220 is, or at least parts thereof are, transparent, so that the image sensor array 240, if located under the displaying surface 220, can capture an image through the displaying surface 220. In an analogous manner, the touch sensor 230 is, or parts thereof are, transparent. In an example embodiment, the displaying surface comprises a transparent indium tin oxide (ITO) layer. The displaying surface comprises a matrix of image forming elements, or display pixels, for generating light and forming an image on the displaying surface. The image forming elements comprise, for example, liquid crystals (LC) or organic light emitting diodes (OLED) or the like. In an example embodiment, the parts of the displaying surface between the display pixels are transparent.

In an example embodiment, the touch sensor 230 comprises a resistive, a surface acoustic wave, a capacitive—such as a surface capacitance, a projected capacitance, a mutual capacitance, or self-capacitance—an infrared, an optical, a dispersive signal and/or acoustic pulse recognition touch sensor or an array thereof.

In an example embodiment, the image sensor array 240 comprises a sensor or sensors forming a sensor surface comprising image pixels. The image sensor array 240 comprises for example charge-coupled device (CCD) and/or complementary metal oxide semiconductor (CMOS) units. In case of a CMOS unit, the image sensor can also contain built-in analog-to-digital conversion elements implemented on common silicon chip with the image sensor array 240. In an alternative example embodiment, a separate analog-to-digital (A/D) conversion is provided between the image sensor array 240 and the processor 210. In a further example embodiment, the image sensor array 240 is configured to be divided into one or more functionally separate image sensors, i.e. groups 240a-f of image pixels, forming a group of image sensors. Each image sensor 240a-f is configured to capture an image. It should be noted that image sensor refers to both a physically separate image sensor and to a group of image pixels chosen from a larger number of image pixels and configured to function as a unit to capture an image. In an example embodiment, an adaptive lens or an array of adaptive lenses, such as electronic liquid crystal lenses, for example configured to be controlled by the processor 210, is integrated with the image sensor array 240 and/or with the displaying surface 220. The lens or the array of lenses is configured to co-operate with the image sensors 240a-f in order to capture an image. In a further example embodiment, the array of lenses is configured to be divided into one or more functionally separate lenses corresponding to each image sensor 240a-f.

It shall be understood that any coupling in this document refers to functional or operational coupling; there may be intervening components or circuitries in between coupled elements unless expressly otherwise described.

The processor 210 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 210, but the apparatus 200 may comprise a plurality of processors.

The memory 260 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 200. Moreover, in some example embodiments, the apparatus comprises a plurality of memories. In some example embodiments, various elements are integrated. For instance, the memory 260 can be constructed as a part of the apparatus 200 or inserted into a slot, port, or the like. Further still, the memory 260 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, wireless communication circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In an example embodiment term apparatus refers to the processor 210. In a further example embodiment, the apparatus refers to a device that comprises the processor 210. In a still further example embodiment, the term apparatus refers to the features of the user interface unit 250.

Figure 3A:
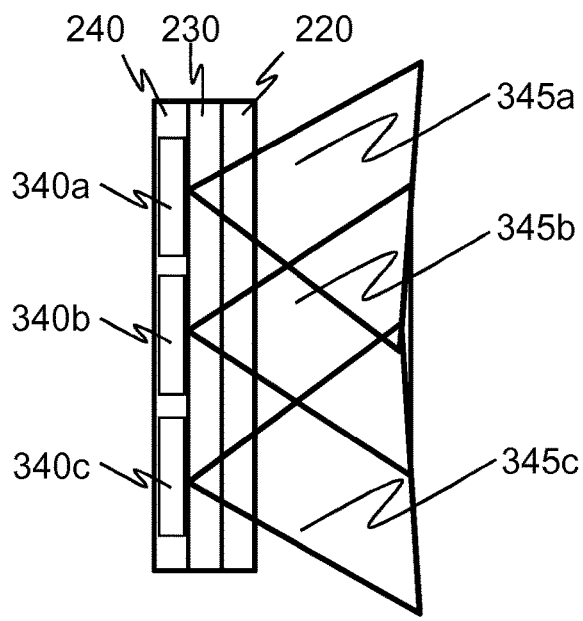
FIG. 3a shows a schematic side view of the principle of an apparatus according to an example embodiment.
Figure 3B:
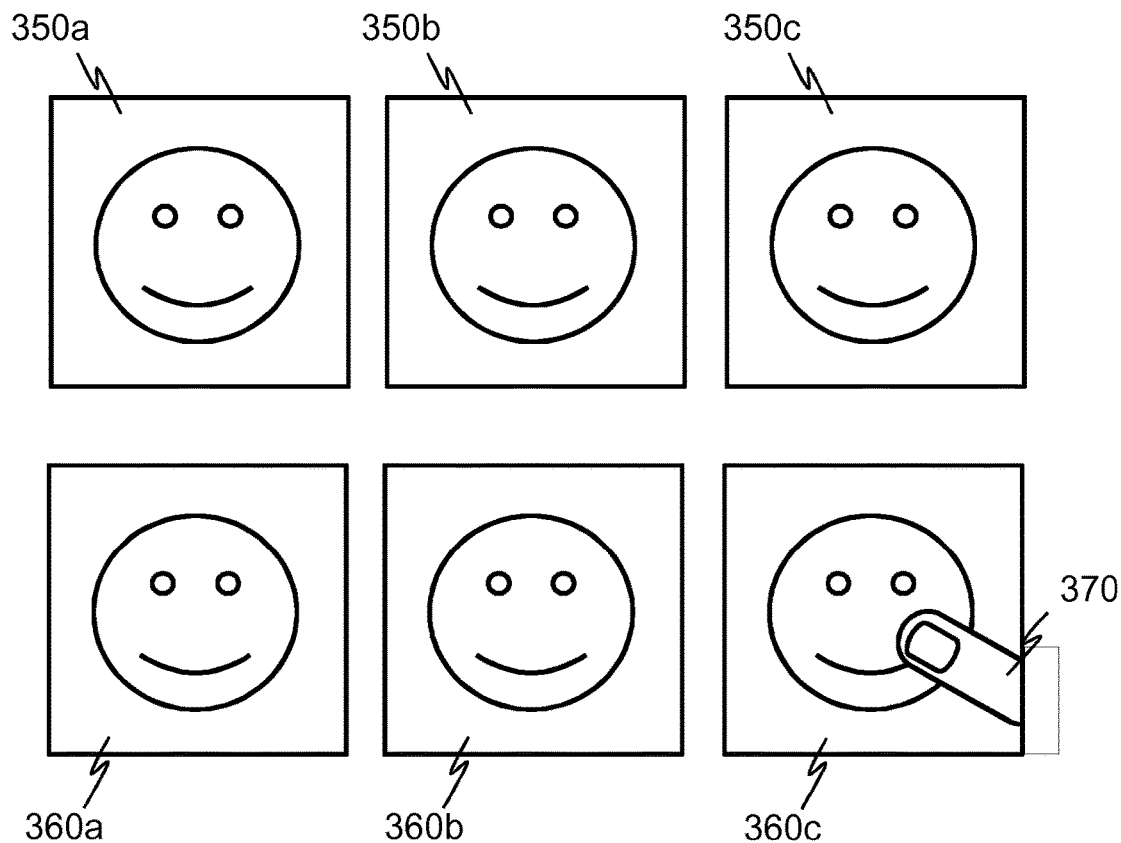
FIG. 3b shows an example of images captured with an array of image sensors.

FIG. 3a shows a schematic side view of the principle of an apparatus according to an example embodiment. Image sensors 340a-c form an image sensor array 240. The displaying surface 220 and touch sensor 230 are at least partially transparent to allow the image sensors 340a-c to capture an image. A skilled person appreciates that the image displaying surface 220, the touch sensor 230 and the image sensor array 240, as well as the adaptive lenses or the array of adaptive lenses (not shown), can be formed into separate layers or partially or wholly into same layer or layers. Furthermore, the depicted order of the displaying surface 220, the touch sensor 230 and the image sensor array 240 is chosen merely for sake of intelligibility and an alternative order is used in a further example embodiment. Each image sensor has a field of view (FOV) 345a-c. The field of view of each sensor is substantially same and, in an example embodiment, the field of view 345a-c can be changed with the adaptive lenses or the array of adaptive lenses. When the display camera comprising the apparatus 200 is pointed at an object to be imaged, each image sensor 340a-c captures a substantially similar image of the object, i.e. the image of each image sensor 340a-c is similarly framed. FIG. 3b shows an example of images 350a-c and 360a-c captured with three image sensors 340a-c. The example images 350a-c are captured in in a situation in which none of the image sensors 340a-c is blocked, and the example images 360a-c are captured in a situation in which one of the image sensors 340a-c is blocked.

Figure 4A:
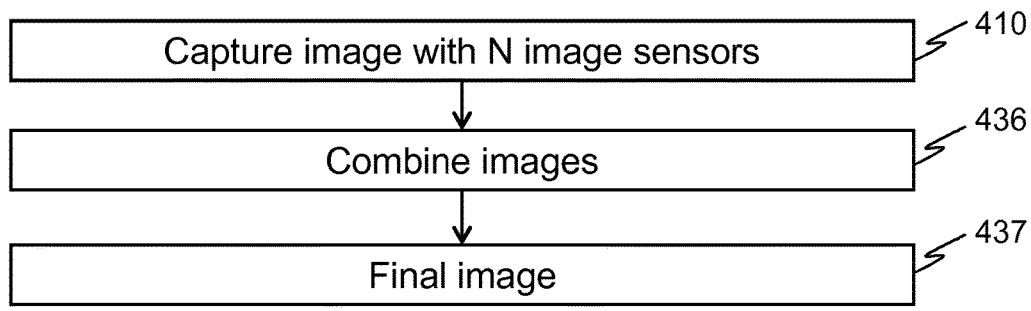
FIG. 4a shows a flow chart of an image forming method using an array of image sensors according to an example embodiment.

FIG. 4a shows a flow chart of an image forming method using an array of image sensors according to an example embodiment. It should be noted that the image being formed refers to both a still image and an image frame of a video. An image 350a-c is captured with N image sensors 340a-c. Each image sensor 240a-c comprises image pixels and the resolution of the captured image 350a-c is dependent on the number of image pixels. At step 410 an image 350a-c is captured with each of the N image sensors 240a-c. A second image, hereinafter referred to as final image, is formed 437 by combining 436 the image of each image sensor 240a-c, for example using a super-resolution algorithm in order reach higher resolution than the image 350a-c of each image sensor 240a-c. In a further example embodiment, the resolution of the final image can be adjusted for example to match the resolution, i.e. the number of display pixels, of the displaying surface.

Occasionally the field of view (345a-c) of an image sensor is obstructed for example by a finger of the user of the apparatus. The obstruction can be accidental or in purpose if the user operates the user interface unit 250 comprising the image sensor array 240 or holds the apparatus 200 comprising the user interface unit a certain way. The image 360c of the obstructed image sensor comprises an artifact 370, for example the finger of the user is blocking the object to be imaged. In a further example embodiment, the blocking of the target to be imaged could result for example from a smudge or the like on the displaying surface or from a malfunction of an image sensor 240a-c. Accordingly, if the final image was formed following the method of FIG. 4a, the final image would also be at least partially disturbed.

Figure 4B:
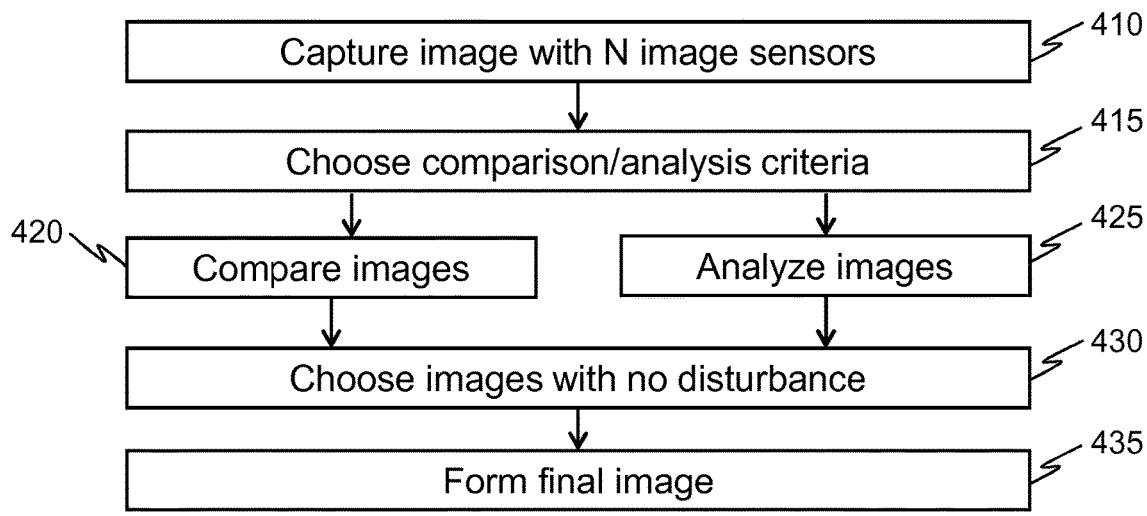
FIG. 4b shows a flow chart of a method of an example embodiment.

FIG. 4b shows a flow chart of a method of an example embodiment. As hereinbefore described, at step 410 an image 350a-c is captured with each of the N image sensors 240a-c. At step 415 criteria for image comparison and/or analysis are chosen. In an example embodiment the criteria comprise detecting black areas in the image, brightness of the image, correlation of the images to look at similarities, color analysis, histogram analysis and/or the like. In a further example embodiment, the criteria are chosen automatically or the user of the apparatus 200 chooses the criteria. At steps 420 and 425 the images are compared to each other in order to find out whether an image 360a-c of an image sensor 240a-c comprises elements, for example a finger, not visible in other images 360*a-c*. In a further example embodiment, each image is analyzed 325 in order to find for example dark areas or blur that make the image unsuitable to be used in forming the final images. Based on the comparison and/or analysis, at step 430 the images 360*a-b* with no disturbance, i.e. having no artifacts, blockage, blur or the like, are chosen to be used in forming the final image. The final image is formed 435 using the chosen images 360*a-b* as hereinbefore described. In a further example embodiment, parts of an image 360*c* containing an undesired element are also used for forming the final image. In an example embodiment, if only the field of view 345*a-c* of a single image sensor is blocked, the image 360*c* different from the images of other images 360*a-b* is not used for forming the final image. In a further example embodiment, if the field of view 345*a-c* of several image sensors is blocked, further analysis and comparison of further parameters, such as hereinbefore described, is carried out.

Figure 5:
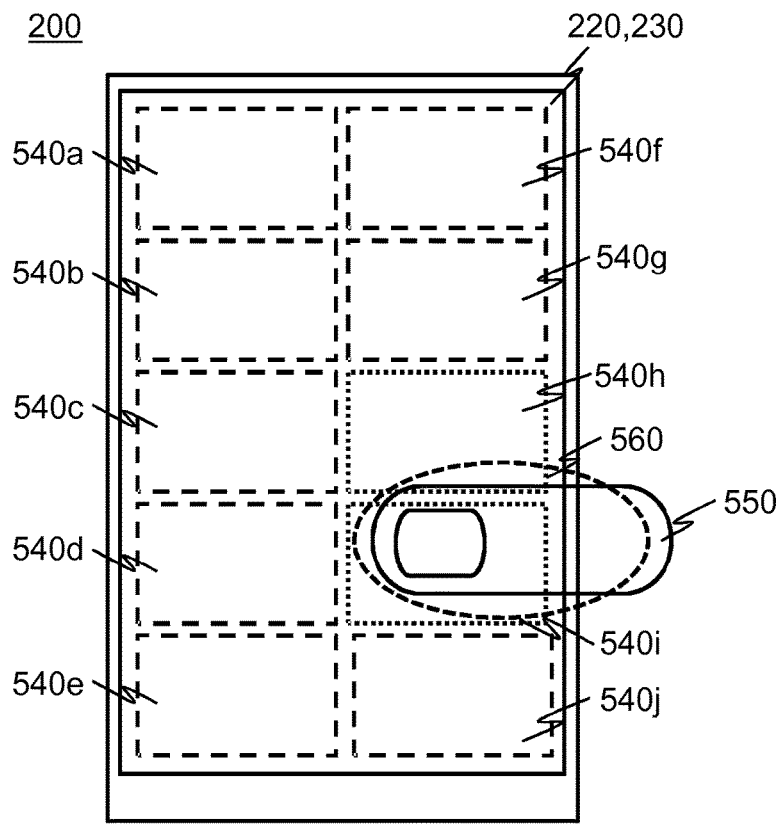
FIG. 5 shows a schematic principle view of an apparatus of an example embodiment.

FIG. 5 shows a schematic principle view of an apparatus 200 of an example embodiment. The apparatus 200 comprises a displaying surface 220 and a touch sensor 230 as hereinbefore described and an image sensor array 240 comprising image sensors 540*a-j*, two of which image sensors 540*h-l* are blocked by a finger 550 of the user of the apparatus. The touch, or the proximity, of the finger 550 is detected by the touch sensor 230. A skilled person appreciated that instead or in addition to the finger 550, the touch of another object, such as a stylus, pen or smudge or the like could be detected.

Figure 6:
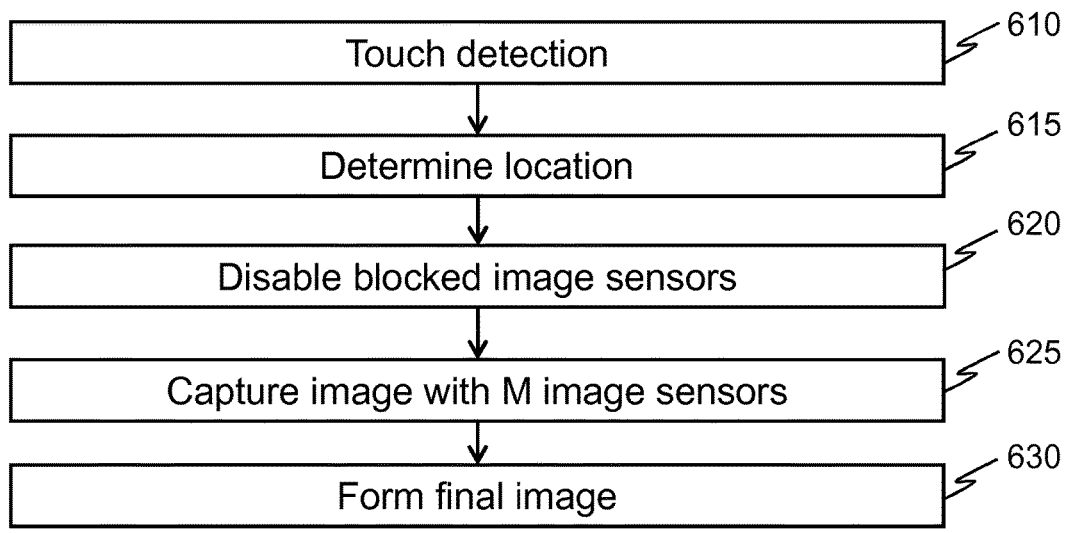
FIG. 6 shows a flow chart of a method of a further example embodiment.

FIG. 6 shows a flow chart of a method of a further example embodiment. At step 610 the touch of the finger 550 is detected with the touch sensor 230. The location 560 of the touch, i.e. the area blocked or affected by the touch or proximity of the finger 550 is determined from the touch detection at 615. Based on the location of the affected area 560, the blocked image sensors 540*h-i* are disabled at 620. At step 625 an image is captured with M active, i.e. not disabled, image sensors 540*a-g,j*—M being a smaller number than the total number N of the image sensors—and the final image is formed 630 from these images as hereinbefore described. In a further example embodiment, the blocked image sensors 540*h-i* are not disabled and an image is captured with all N image sensors 540*a-j*, but the images captured with the blocked image sensors 540*h-i* are by default excluded from further processing. In a further example embodiment, the disabled image sensors 540*h-i* are activated after a touch or proximity of an object is not detected anymore.

Figure 7A:
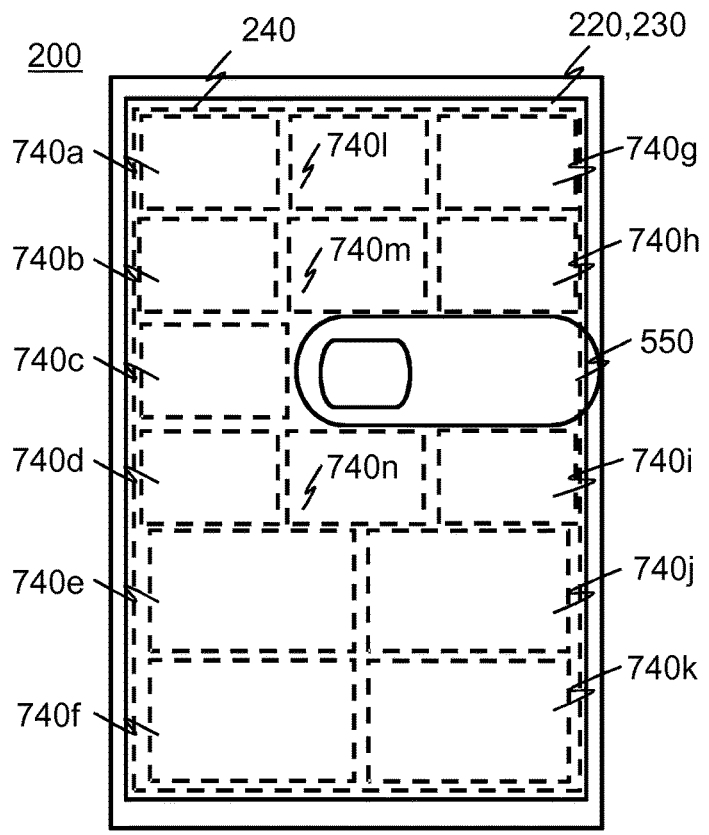
FIGS. 7a and 7b show a schematic principle view of an apparatus of an example embodiment.
Figure 7B:
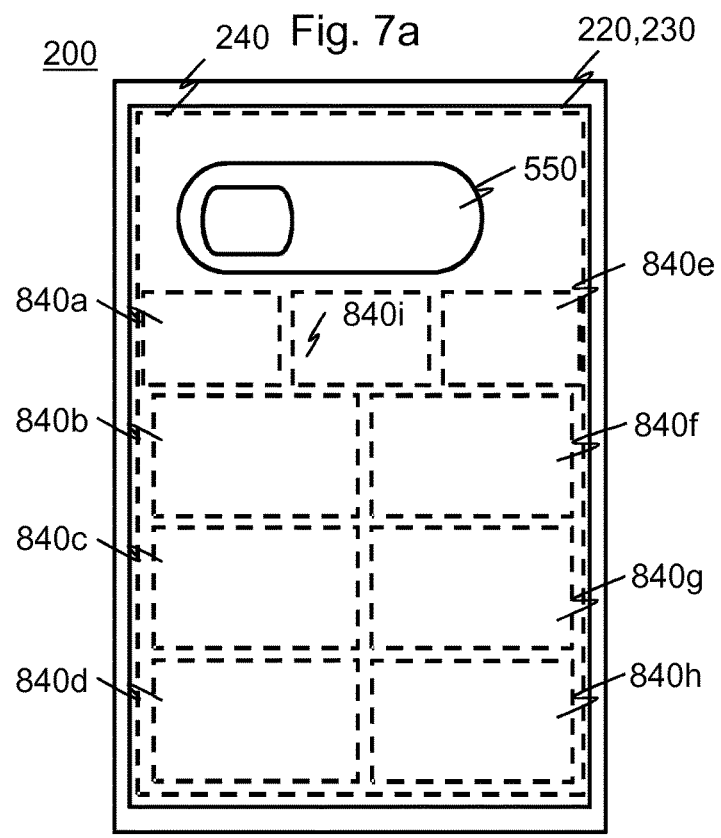

FIGS. 7*a* and 7*b* show a schematic principle view of an apparatus 200 of an example embodiment. The apparatus 200 comprises a displaying surface 220 and a touch sensor 230 as hereinbefore described and an image sensor array 240. The image sensor array 240 is configured to be adaptive, i.e. configured to be divided into one or more separate image sensors, i.e. groups 740*a-k*,840*a-h* of image pixels, each image sensor 740*a-k*,840*a-h* being configured to capture an image. The size and number of image sensors 740*a-k*,840*a-h* is chosen in accordance with the operation of the device. In an example embodiment, the image sensors, and the adaptive lenses or the array of adaptive lenses (not shown), are arranged in accordance with the application being used by the user and run on the processor 210, or for example in accordance with control options, such as soft buttons, provided on the displaying surface 220. In an example embodiment the image sensors, and the adaptive lenses or the array of adaptive lenses (not shown), are arranged in such a way as to disable those elements of the sensor array 240 that are situated at a location most likely to be blocked by the user when operating the device while using a certain application. The size and number of the image sensors 740*a-k*,840*a-h* that are not disabled is automatically chosen in such a way as to use as much of the unblocked surface of the image sensor array 240 as possible and/or in such a way as to ameliorate the processing speed and/or image quality. In a further example embodiment, the size, location and/or number of the image sensors 740*a-k*, 840*a-h* is adapted in a similar manner in accordance with the location of the touch detected with the touch sensor 230, i.e. the area of the image sensor array 240 blocked or affected by the touch or proximity of an object 550 is not used. A skilled person appreciates that the adaptive sensor array is useful for example in capturing a video during a video conference, when concurrently with capturing the video several finger locations and applications are used.

Figure 8:
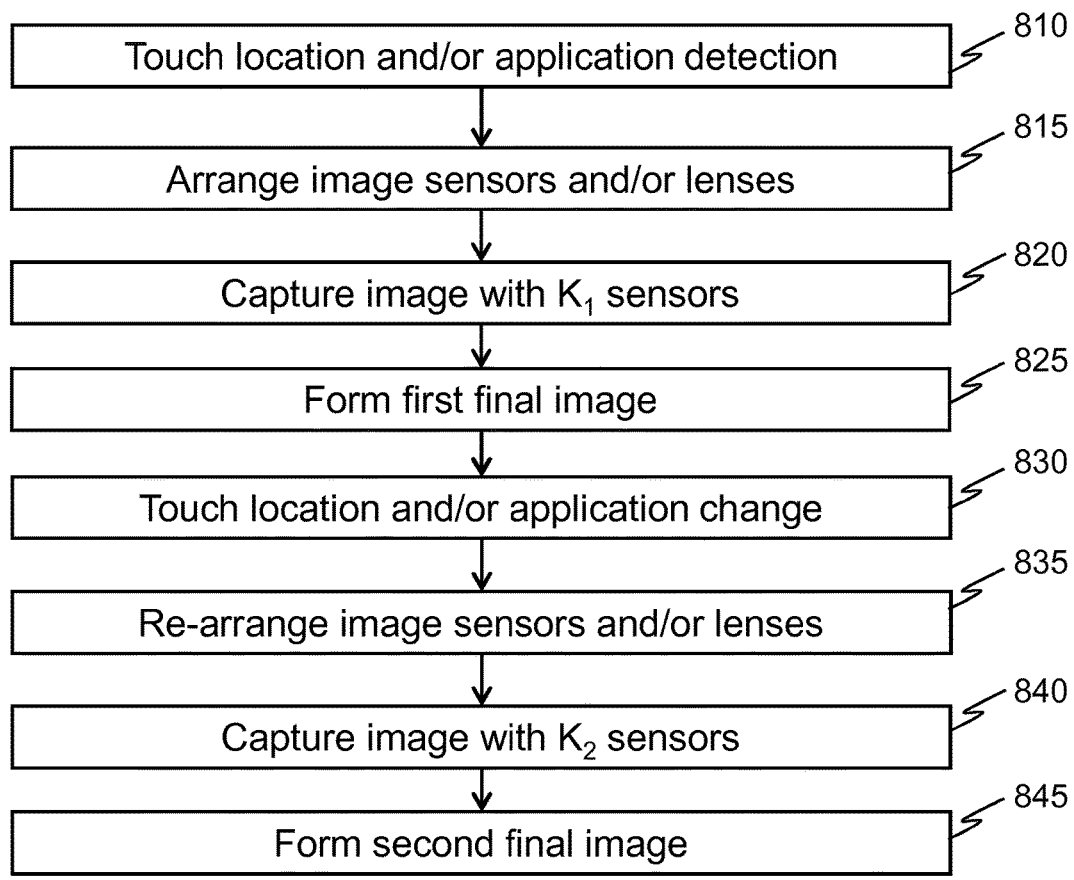
FIG. 8 shows a flow chart of a method of a further example embodiment.

FIG. 8 shows a flow chart of a method of a further example embodiment. At step 810 the location of the touch or proximity of an object is detected with the touch sensor 230 and/or the used application is detected. At 815, based on the location of the affected area and/or based on the used application, the image sensor array 240, and the adaptive lenses or the array of adaptive lenses (not shown), is arranged to comprise image sensors 740*a-k* on the areas not affected by the touch or not likely to be used while using the detected application. At step 820 an image is captured with $K_1$ image sensors 740*a-k* and a first final image is formed at 825 as hereinbefore described. At step 830 a change in location of the touch or proximity is detected and/or a different application is detected. At step 835 the image sensor array adapts to the situation and the image sensor array 240, and the adaptive lenses or the array of adaptive lenses (not shown), is arranged to comprise image sensors 840*a-h* on the areas not affected by the touch or not likely to be used while using the detected application. At step 840 an image is captured with $K_2$ image sensors 840*a-h* and a second final image is formed 845 as hereinbefore described. In a further example embodiment, the area of the image sensor array 240 affected by the touch or proximity or likely to be blocked while using an application is not disabled, but the images captured with the affected area of the image sensor array 240 are by default excluded from further processing.

Some use cases relating to given example embodiments of the display camera operation are presented in the following. In a first use case a user of a device, e.g. a mobile phone or a tablet computer, comprising the display camera of the apparatus 200 wishes to capture an image of an object. The user has to hold the device, for example to diminish hand shake, in such a way that her finger blocks the field of view of at least one image sensor. As a final image is formed in accordance with an example embodiment, the device can be held in such a way as to block a part of the display camera.

In a second use case, a user of a device, e.g. a mobile phone or a tablet computer, comprising the display camera of the apparatus 200 wishes to engage in a Voice over Internet Protocol (VoIP)-phone call and concurrently browse Internet sites. As the image frames of the video are formed in accordance with an example embodiment, the user can transmit her image to the person she is conversing with without any disturbance from concurrent operation of an Internet browser.

In a third use case, a user of a device, e.g. a mobile phone or a tablet computer, comprising the display camera of the apparatus 200 wishes to capture an image of herself to be used for example in social media applications. While shooting the image she wishes to adjust image capturing options such as ISO-value or white balance using control elements provided on the displaying surface. As a final image shown on the touch sensitive display is formed in accordance with an example embodiment, the user can adjust the options without disturbing the resulting image.

In a fourth use case a user of a device, e.g. a mobile phone or a tablet computer, comprising the display camera of the apparatus 200 wishes to engage in a video conference and concurrently take notes using the touch sensitive display into which the image sensor array is integrated. As the image frames of the video are formed in accordance with an example embodiment, the video conference proceeds without any disturbance from concurrent writing.

Without in any way limiting the scope, interpretation, or application of the claims appearing below, a technical effect of one or more of the example embodiments disclosed herein is to provide undisturbed images with a display camera while operating or holding the device comprising the display camera. Another technical effect of one or more of the example embodiments disclosed herein is to improve user experience by allowing the user to operate the device in the same manner independent of whether the display camera is capturing an image or not. Another technical effect of one or more of the example embodiments disclosed herein is to provide a display camera capable of adapting to different applications.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
   a user interface comprising
      a displaying surface;
      an image sensor array integrated with the displaying surface, the image sensor array comprising a group of image sensors, each image sensor being configured for capturing an image; and
      a touch sensor; and
   a processor being configured for controlling the user interface; wherein
   the processor is configured to cause
      capturing a first image with each active image sensor of the group of image sensors;
      choosing a number of images from the first images; and
      forming a second image from the chosen images;
   wherein the processor is further configured to cause changing a number of active image sensors in the group of image sensors in response to a captured disturbed image.

2. The apparatus of claim 1, wherein the processor is further configured to cause activating or disabling an image sensor of the group of image sensors.

3. The apparatus of claim 2, wherein the processor is further configured to cause activating or disabling an image sensor of the group of image sensors in response to a touch or proximity of an object detected by the touch sensor.

4. The apparatus of claim 2, wherein the processor is further configured to cause activating or disabling an image sensor of the group of image sensors in response to an application being run on the processor.

5. The apparatus of claim 1, wherein the processor is further configured to cause changing the size of an adaptive image sensor of the group of image sensors.

6. The apparatus of claim 5, wherein the processor is further configured to cause changing the size of an adaptive image sensor of the group of image sensors in response to a touch or proximity of an object detected by the touch sensor.

7. The apparatus of claim 5, wherein the processor is further configured to cause changing the size of an adaptive image sensor of the group of image sensors in response to an application being run on the processor.

8. The apparatus of claim 1, wherein the processor is further configured to cause changing the number of the active image sensors in the group of image sensors in response to a touch or proximity of an object detected by the touch sensor.

9. The apparatus of claim 1, wherein the processor is further configured to cause changing the number of the active image sensors in the group of image sensors in response to an application being run on the processor.

10. The apparatus of claim 1, wherein the processor is further configured to cause choosing the images from the first images based on a comparison of the images.

11. The apparatus of claim 1, wherein the processor is further configured to cause choosing the images from the first images based on an analysis of each first image.

12. The apparatus of claim 1, wherein the processor is further configured to cause forming the second image from the chosen images using a super-resolution algorithm.

13. The apparatus of claim 1, wherein the second image is part of a sequence of images.

14. The apparatus of claim 13, wherein the sequence of images comprises a video.

15. A method, comprising:
   providing a user interface comprising a touch sensor, an image sensor array integrated with a displaying surface, the image sensor array comprising a group of image sensors, each image sensor being configured for capturing an image;
   capturing a first image with each active image sensor of the group of image sensors;
   choosing a number of images from the first images;
   forming a second image from the chosen images; and
   activating or disabling an image sensor in the group of image sensors in response to a captured disturbed image.

16. The method of claim 15 further comprising activating or disabling an image sensor of the group of image sensors in response to a touch or proximity of an object detected by the touch sensor.

17. The method of claim 15 further comprising activating or disabling an image sensor of the group of image sensors in response to an application being run on the processor.

18. The method of claim 15 further comprising changing the size of an adaptive image sensor of the group of image sensors.

19. The method of claim 18 further comprising changing the size of the adaptive image sensor of the group of image sensors in response to a touch or proximity of an object detected by the touch sensor.

20. The method of claim 18 further comprising changing the size of the adaptive image sensor of the group of image sensors in response to an application being run on the processor.

21. The method of claim 15 further comprising changing the number of the active image sensors in the group of image sensors.

22. The method of claim 21 further comprising changing the number of the active image sensors in the group of image sensors in response to a touch or proximity of an object detected by the touch sensor.

23. The method of claim 21 further comprising changing the number of the active image sensors in the group of image sensors in response to an application being run on the processor.

24. The method of claim 15 further comprising choosing the images from the first images based on a comparison of the images.

25. The method of claim 15 further comprising choosing the images from the first images based on an analysis of each first image.

26. The method of claim 15 further comprising forming the second image from the chosen images using a super-resolution algorithm.

27. The method of claim 15, wherein the second image is part of a sequence of images.

28. The method of claim 27, wherein the sequence of images comprises a video.

29. A computer program product comprising a non-transitory computer-readable medium bearing computer program code embodied therein for use with a computer, the computer program code comprising:
- code for capturing a first image with an active image sensor of a group of image sensors;
- code for choosing a number of images from the first images;
- code for forming a second image from the chosen images; and
- code for activating or disabling an image sensor in the group of image sensors in response to a captured disturbed image.

* * * * *